J. E. INMAN.
PLANT POT.
APPLICATION FILED MAY 16, 1913.
1,113,350.
Patented Oct. 13, 1914.
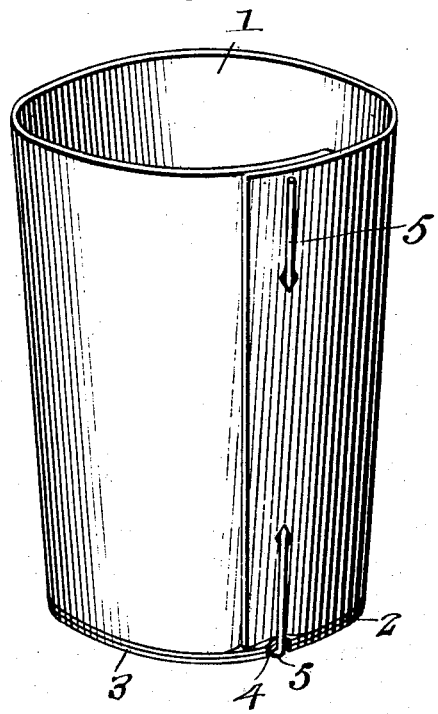
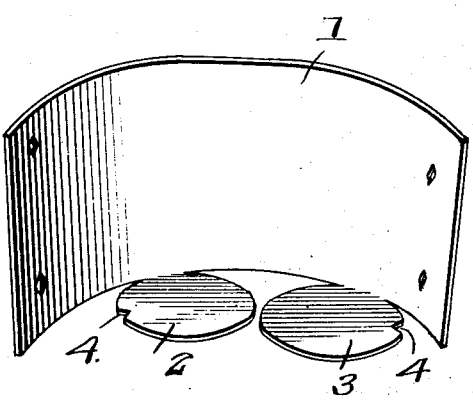
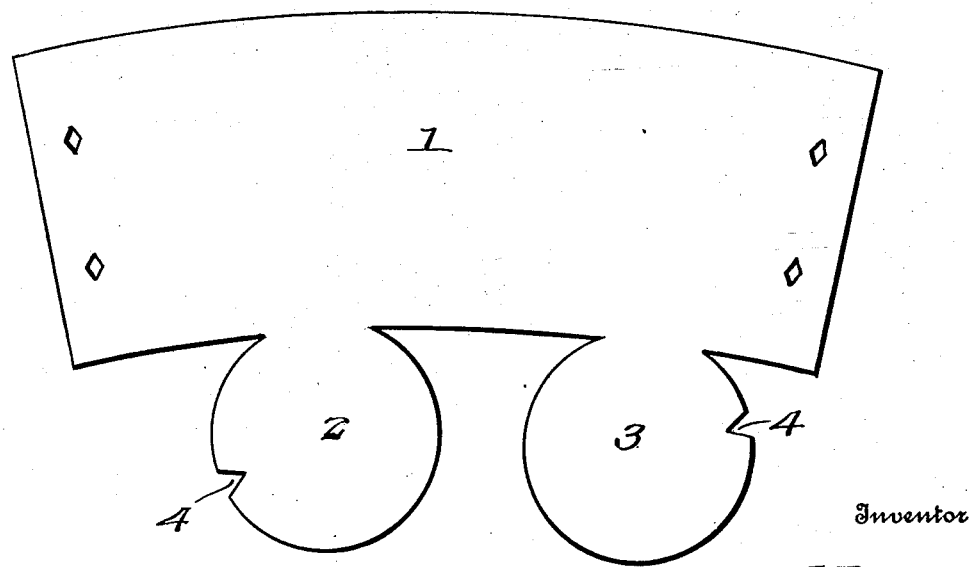
Witnesses
Hugh H. Ott
D. W. Gould
Inventor
Jesse E. Inman
By Victor J. Evans
Attorney

UNITED STATES PATENT OFFICE.

JESSE ERSKINE INMAN, OF SALT LAKE CITY, UTAH.

PLANT-POT.

1,113,350.  Specification of Letters Patent.  Patented Oct. 13, 1914.

Application filed May 16, 1913. Serial No. 768,097.

*To all whom it may concern:*

Be it known that I, JESSE E. INMAN, a citizen of the United States, residing at Salt Lake City, in the county of Salt Lake and State of Utah, have invented new and useful Improvements in Plant-Pots, of which the following is a specification.

The invention relates to an improvement in pots designed primarily for use as transplanting pots and through the use of which the plants developed in a hot house may be transplanted and protected by the improved pot until sufficiently developed.

The main object of the present invention is the provision of a transplanting pot so constructed and of such material that it may be allowed to remain in the ground after transplanting operation and will as a result of the material of which it is constructed, finally disintegrate or decay when the purpose for which it has been used is accomplished.

A further object of the invention is the provision of a transplanting pot constructed practically of an integral strip so that the pots as a whole may be initially packed into small compass and in flat condition, shaped into pot form when desired for use, the entire structure being preferably of paper or similar moisture penetrating material.

The invention in its preferred form of details will be described in the following specification, reference being had particularly to the accompanying drawings, in which:—

Figure 1 is a perspective view of the pot in completed form. Fig. 2 is a similar view showing the blank partly folded. Fig. 3 is a view of the blank.

Referring particularly to the accompanying drawings, the improved transplanting pot, which as previously stated, is constructed of paper or similar moisture penetrating material of little cost is made of a single sheet which in forming the blank is shaped to provide a main section 1 having a length somewhat exceeding the circumferential length of the completed pot and having the upper and lower edges on curved lines and the side edges downwardly convergent so that the completed pot will have the usual tapered form. Integrally with the section 1 the blank is formed to provide two circular sections 2 and 3, connected for an appreciable length of their circular edges with the section 1 and arranged in such spaced relation that when the section 1 is shaped to conform to the wall of the body the circular sections 2 and 3 will be arranged in superimposed relation and form a double bottom for the pot, the points of connection of said sections being approximately at diametrically opposed points of the bottom edge of the wall. At an appropriate point in the edge of each of the circular sections 2 and 3 is formed a notch 4 which notches are designed to register when the blank is shaped to form the completed pot.

In forming the pot, the main section is rolled with the side edges in overlapping relation, the circular sections 2 and 3 being bent at right angles to the main section 1 so that said sections will naturally form the bottom of the cylindrical member provided in rolling the main section. A connector 5 comprising an L-shaped strip is used to secure the blank in body forming shape, the main or longer section of the connector being threaded through registering openings in the lapping edges of the main section of the blank and the shorter arm of the connector resting beneath the bottom. The connector seats within the notches 4 and thus prevents independent movement of the sections while the short arm of the connector effectively supports them practically throughout their diametric extent.

The pot is used for transplanting from a hot house or other forcing station to the field, and the plant within the pot is planted in the field together with the pot. The pot is constructed of thin cardboard, paper or the like, which will readily permit natural moisture of the ground surrounding the pot to reach the plant while at the same time will provide sufficient security against the usual cut worms, or other destructive agents. The material of the pot is of such character that it will gradually decay or disintegrate and will form practically no obstruction to the natural spreading of the roots of the plant as the same increases in growth. The blanks may be shipped and stored in flat condition and readily made up into pots as needed, while the material together with the simplified means of construction, permits the pots to be manufactured at such a cost that the single use to which they are restricted is not prohibitory in commercial sense.

What is claimed is:—

A pot constructed of a blank including a main section adapted when rolled to form a wall of the pot, a plurality of integral spaced circular sections adapted to form a double bottom for the pot, and means for connecting the meeting edges of the main section of the blank to hold same in pot wall forming
5 relation, said means including a laterally extending member to underlie the bottom of the pot.

In testimony whereof I affix my signature in presence of two witnesses.

JESSE ERSKINE INMAN.

Witnesses:
A. H. McDONALD,
W. H. McKEAG, Jr.